United States Patent [19]

Houston

[11] Patent Number: 4,990,932

[45] Date of Patent: Feb. 5, 1991

[54] INK DROPLET SENSORS FOR INK JET PRINTERS

[75] Inventor: Robert D. Houston, Rochester, N.Y.

[73] Assignee: Xerox Corporation, Stamford, Conn.

[21] Appl. No.: 412,361

[22] Filed: Sep. 26, 1989

[51] Int. Cl.[5] .......................... G01D 15/18; H01J 5/16

[52] U.S. Cl. .................................. 346/45; 250/227.11

[58] Field of Search ...................... 346/75; 250/227.11

[56] References Cited

U.S. PATENT DOCUMENTS

| | | | |
|---|---|---|---|
| 4,255,754 | 3/1981 | Crean et al. | 346/75 |
| 4,344,078 | 8/1982 | Houston | 346/75 |
| 4,498,004 | 2/1985 | Adolfsson et al. | 250/227 |
| 4,510,504 | 4/1985 | Tamai et al. | 346/75 |
| 4,550,322 | 10/1985 | Tamai | 346/75 |
| 4,551,731 | 11/1985 | Lewis et al. | 346/75 |
| 4,751,517 | 6/1988 | Crean et al. | 346/75 |

*Primary Examiner*—Bruce A. Reynolds
*Assistant Examiner*—Gerald E. Preston
*Attorney, Agent, or Firm*—Robert A. Chittum

[57] ABSTRACT

Improved differential optical sensors are mounted at every intersection of the deflection planes of the ink droplets issued by a multi-nozzle printhead of a page-width ink jet printer. These sensors are located near the printing plane and gutters of the printer. They comprise first and second input apertures, each being coupled to a light source and fixedly located to direct beams of light to a confronting associated pair of output apertures. The input and output apertures are on opposite sides of the droplet deflection plane, and the input apertures are on opposite sides of a perpendicular line extending from the midpoint between the pair of output apertures. The light beams impinge the pair of output apertures thereby creating differentially detected zero-crossing optical axes at predetermined angles with respect to the perpendicular line therefrom. The output apertures are coupled to differential circuitry via photodetectors, so that horizontal droplet position may be determined relative to droplet charge voltage and vertical droplet position may be measured in absolute value above the output apertures.

6 Claims, 5 Drawing Sheets

INK DROPLET SENSORS FOR INK JET PRINTERS

BACKGROUND OF THE INVENTION

1. Field of the Invention

This invention relates generally to optical sensing of droplets in ink jet printers and more particularly to two-dimensional differential optical sensors for sensing the position of ink droplets relative thereto while they are in flight.

2. Description of the Prior Art

Generally, pagewidth ink jet devices of the continuous stream type employ a printhead having multiple nozzles from which continuous streams of ink droplets are emitted and directed to a recording medium or a collecting gutter. The printhead has an aperture plate with at least one row of nozzles or orifices through which the ink is ejected under pressure to form a row of parallel streams. The ink is stimulated prior to or during its exiting from the nozzles so that the stream breaks up in a series of uniform droplets at a fixed distance from the nozzles. As the droplets are formed, they are selectively charged by the application of a charging voltage by electrodes positioned adjacent the streams at the location where they break up into the droplets. The droplets which are charged are deflected by an electric field either into a gutter for ink collection and reuse, or to a specific location on the recording medium, such as paper, which may be continuously transported at a relatively high speed across the paths of the droplets.

Printing information is transferred to the droplets from each nozzle through charging by the electrodes, the charging control voltages are applied to the charging electrodes at the same frequency as that which the droplets are generated. This permits each droplet to be individually charged so that it may be positioned at a distinct location different from all other droplets or sent to the gutter. Printing information cannot be transferred to the droplets properly, unless each charging electrode is activated in proper phase with the droplet formation at the associated ink stream. As the ink droplets proceed in flight towards the recording medium, they are passed through a static electric field which deflects each individually charged droplet in accordance with its charge magnitude to specific pixel locations on the recording medium. Thus, to calibrate the ink jet printer so that the ink droplets impact the desired locations on the recording medium, the trajectories of the ink droplets for each nozzle must be determined and adjusted. Each nozzle is responsible for printing a line segment and the droplets emitted thereby may follow a plurality of trajectories in a deflection plane depending on its charge to print a series of adjacent pixels to produce a line segment on the recording medium.

U.S. Pat. No. 4,510,504 to Tamai et al discloses an ink droplet sensor for a multi-jet ink jet printer comprising a light emitter and a plurality of light receivers. In one embodiment, each nozzle for ejecting ink droplets has a light emitter that is to one side of the ink droplet flight path or trajectory and a set of light receivers on the other side of the droplet trajectory. The light refracted from a passing droplet to one of the receivers of the set determines, in combination with the intensity of the refracted light sensed, the flight path or trajectory of the droplet. In another embodiment, the light emitter and at least one of the plurality of receivers are aligned with the droplet trajectory of each nozzle. The light emitters and receivers are mounted in a common base plate and are substantially coplanar with each other.

U.S. Pat. No. 4,344,078 to Houston discloses a continuous stream ink jet printing system with an optical fiber sensor array positioned adjacent and upstream from a recording medium. A test gutter is positioned on the downstream side of the recording medium. The sensor array is used when the recording medium is not present to calibrate the charging voltages for a plurality of droplet streams. The sensor array includes two optical fiber sensors for each stream of droplets, one for each endmost droplet trajectory. Each sensor comprises an input fiber which directs a beam of light to two output fibers, identified as A and B fibers. Groups of the A and B fibers are terminated at common photodetectors requiring the A and B fibers to cross each other's paths. This is accomplished by fabricating the A fibers in one plane and the B fibers in a second adjacent plane.

U.S. Pat. No. 4,498,004 to Adolfsson et al discloses a measuring device having a transducer and an electronic unit interconnected by at least one optical fiber. The electronic unit has one or more light sources for transmitting light via the fibers to a sensor element, forming a part of the transducer, and one or more light detectors. At least one sensor element has a non-linear relationship between the incident light intensity illuminating the sensor element and the intensity of the light emitted from the sensor element. The light sources are arranged to emit light having at least two different light intensities and the detectors are arranged to measure the light coming from the sensor element.

U.S. Pat. No. 4,550,322 to Tamai discloses a drop sensor for an ink jet printer for determining the two-dimensional position of an ink drop as it flies through the sensor. A plurality of light emitting elements emit light beams which cross in pairs in the space defined by the sensor. A plurality of light receiving elements are aligned to receive the light beams projected from specific light emitting elements and to generate signals having magnitudes proportional to the intensities of the light received by the light receiving elements. A plurality of differential amplifier circuits compare the outputs of adjacent light receiving elements to determine whether an ink drop is coincident with selected matrix points within the sensor.

U.S. Pat. No. 4,551,731 to Lewis et al discloses a continuous stream type ink jet printer which has a detector means provided which sense values representative of droplet placement errors of test droplets in the direction of relative movement of the surface of the recording medium and the printer, and has control means responsive to the sensed values to advance or retard the application of the charge to the droplets to correct for the droplet placement errors.

U.S. Pat. No. 4,255,754 to Crean et al discloses the use of paired photodetectors to sense ink drops, one each for two output fibers that are used to generate an electrical zero crossing signal. The zero crossing signal is used to indicate alignment or misalignment of a droplet relative to the bisector of a distance between two output fibers. The sensor of this patent employs one input optical fiber and at least two output optical fibers. The free ends of the fibers are spaced a small distance from each other; the free end of the input fiber is on one side of the flight path of the droplets and the free end of the output fibers are on the opposite side. The remote end of the input fiber is coupled to a light source, such as an infra-red light emitting diode (LED). The remote ends of each output fiber are coupled to photodetectors such as, for example, a photodiode responsive to infra-red radiation. The ink is substantially a dye dissolved in water and is, of course, transparent to infra-red light, thus reducing the problems of contamination usually associated with ink droplet sensors. The photodiodes are coupled to differential amplifiers so that the output of the amplifiers are measurements of the location of droplets relative to the bisector of the distance between the output fiber ends confronting their associated input fibers and droplets passing therebetween. Amplifier outputs are used in servo loops to position subsequently generated droplets to the bisector location where equal amounts of light are blocked from each output fiber by passing droplets. The temporal zero crossing may be used, depending upon its orientation with respect to the droplet stream direction, as a time reference to measure the velocity of the drop. Therefore, the droplet velocity information may be used in a servo loop to achieve a desired velocity. The patent to Crean et al therefore discloses sensing the ink droplets in the plane of their travel and deflection.

Using an orthogonal coordinate system, the nominal trajectory of the uncharged droplets from the nozzle to the recording medium is the Z axis, and the deflection of the charged droplets by the deflection field is the X axis. The height of the droplet perpendicular to this XZ plane is the Y direction, and as disclosed in this patent, an ink droplet passing exactly through the bisector of the two output or receiving fibers cannot detect droplet position in the Y direction. This is because the sensor optical axis is perpendicular to the XZ plane, and the sensor differential output signal is not predictably affected by droplet Y position. By using one of these differential droplet sensors at a location midway between adjacent nozzles, the stitch point between end droplets can be controlled so that the segments of each line of droplets to be printed by each adjacent nozzle may be adjusted to prevent gaps or overprinting in the X direction on the recording medium. However, no sensing and control of the droplets Y position concurrently with the sensing and control of the droplets in the X direction is possible with this configuration.

U.S. Pat. No. 4,751,517 to Crean et al discloses a two-dimensional differential optical sensor for a continuous stream ink jet printer which senses the position of the droplets in the X or deflection direction and in the Y direction by combining a first single optical axis sensor of the type disclosed in U.S. 4,255,754 with another similar single optical axis sensor inclined at a predetermined angle with the first sensor, in order to monitor concurrently the droplet position in both the deflection direction and a direction perpendicular to it. A stitch point is the interface between printed line segments and was established at each droplet stream's deflection boundary (endmost droplet trajectory). The stitch point measurement is nominally perpendicular to the undeflected droplet trajectory and is made in a plane nominally parallel to the printing plane (i.e., recording medium's surface). A sensor according to U.S. 4,255,754 was located at each stitch point measurement location, and every other one was modified according to U.S. 4,751,517 wherein another set of optical sensors was incorporated, but with the optical axis at a nominally fixed angle $\theta$ with respect to the stitch point measurement optical axis in a second plane. Through calculations using the deflection voltages corresponding to droplet deflection sensed at the stitch and inclined sensor optical axes, the absolute droplet elevation was determined. The measured stitch and elevation (sagittal) values were stored in the controller of the printer and used for subsequent corrections of droplet trajectories.

Several problems remain with the approach of U.S. 4,751,517. First, the use of a two plane structure for the combined sensors resulted in fabrication problems involving accurate positioning of the stitch and sagittal light beam axes with respect to each other, both horizontally (deflection plane or X direction) and in the ink stream or Z direction. In practice, this has meant a time consuming characterization of the sensor structure, with individual parameters stored for each sagittal/-stitch pair; viz., the absolute spatial equations for each pair of optical axes. Further, the inability to both hold the sagittal (elevation) to stitch axis separations in the Z direction constant and to characterize this factor results in an uncorrected measurement error in both the stitch and sagittal values optically obtained by the sensors, so that subsequent droplet placement errors occurred.

Another difficulty with this scheme of performing a sagittal measurement and calculation is encountered because they were done at only every other stitch point or droplet stream deflection boundary. Even if a perfect measurement of droplet elevation was made, there is no way to correct for the significant error introduced at the non-sagittally measured boundaries by variation in the deflection plane tilt (refer to FIG. 3, deflection plane 70 of U.S. 4,751,517) other than by acquiring a priori knowledge of the absolute value of the tilt angle of the droplet deflection plane for each droplet stream. Further, this structure is quite complex, requiring a total of three light sources and three differential receiver pairs per boundary of each set of droplet trajectories per nozzle. If a sagittal measurement were made at each boundary to avoid the problem of deflection plane tilt variation, then four light sources and four differential receiver pairs per boundary would be required. Finally, the use of a multiplicity of light sources and receiver pairs can create undesired spurious or secondary optical light beams which are erroneously sensed by the receiver pairs unless the light emission angles are kept very small or the light sources are independently switched off when not being used.

SUMMARY OF THE INVENTION

It is the object of this invention to provide an improved differential optical sensor for an ink jet printer which is simple to fabricate and eliminates uncorrectable measurement errors caused by variation in the light beam axes relative to the droplet travel direction and caused by the droplet deflection plant tilt.

In the present invention, improved differential optical sensors are mounted at every intersection of adjacent deflection planes of the ink droplets issued by a multi-nozzle printhead of an ink jet printer. These sensors are located near the printing plane and gutters of the printer. They comprise first and second input optical emitters fixedly located to direct beams of light to a confronting associated pair of output optical detectors. The emitters and detectors are on opposite sides of the droplet deflection plane, and the emitters are on opposite sides of a perpendicular line midway between the detector pair and the emitter plane. Each emitter in conjunction with the pair of detectors creates a differentially detected optical axis at predetermined angles with respect to the perpendicular line. The pairs of detectors are coupled to differential circuitry, so that each sensed droplet position may be accurately determined in both the droplet deflection direction and a direction perpendicular thereto as the droplet travels along its flight path therepast.

A more complete understanding of the present invention can be obtained by considering the following detailed description in conjunction with the accompanying drawings, wherein like index numerals identify like parts.

DESCRIPTION OF THE PREFERRED EMBODIMENT

Figure 1:
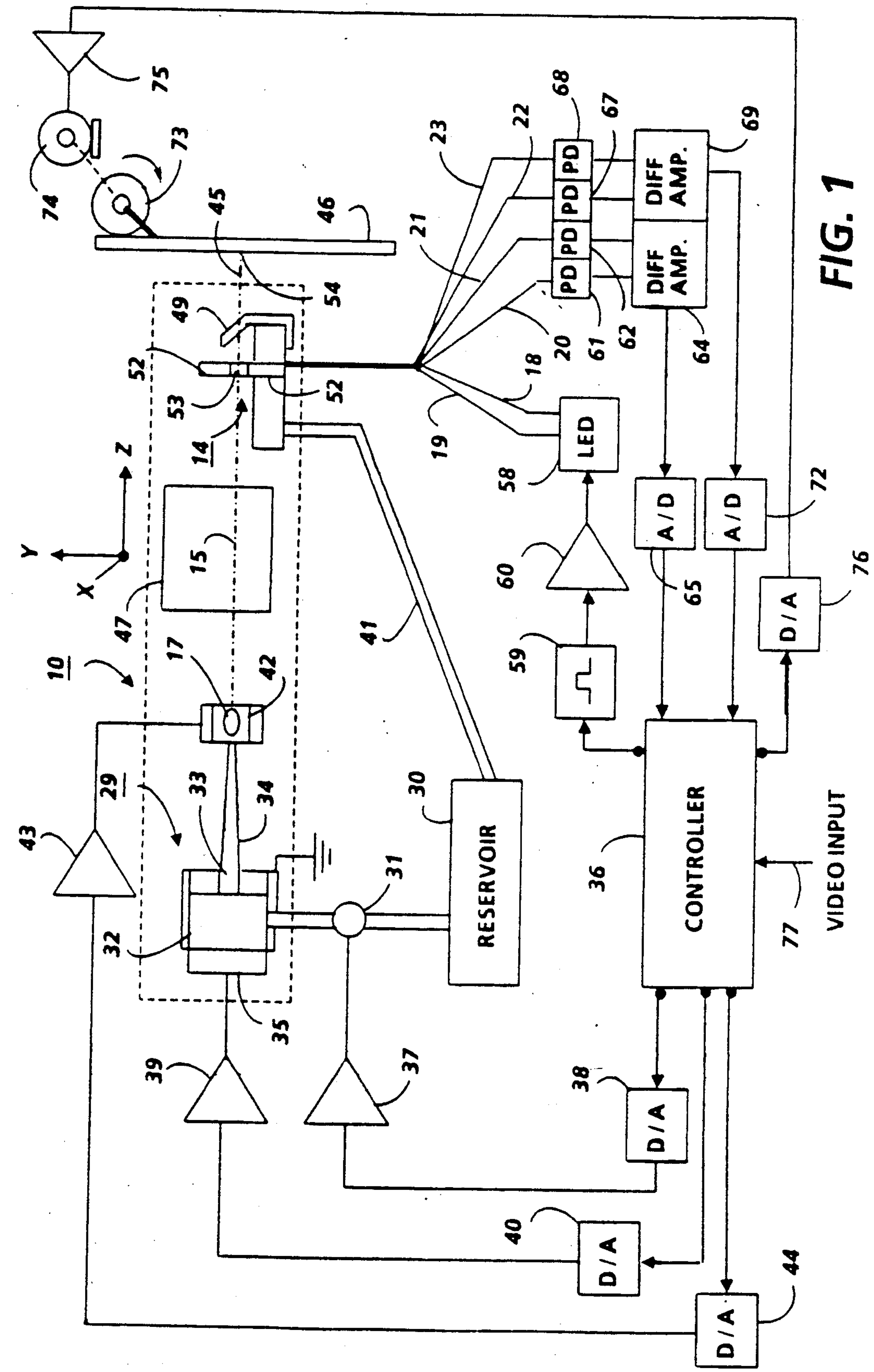
FIG. 1 is an elevation view in schematic form of a pagewidth printer printhead using multiple droplet position sensors according to the present invention.

Referring to FIG. 1, a continuous stream ink jet printing system is depicted employing a plurality of the position sensors of the present invention. A fluid ink contained in reservoir 30 is moved by pump 31 into the manifold 32 of an ink droplet generator 29 of the printhead 10 shown in dashed line. The manifold includes a plurality of nozzles 33 which emit a continuous stream of ink 34. Droplets 17 are formed from the stream at a finite distance from the nozzle due to regular pressure variations imparted to the ink in the manifold by a piezoelectric device 35. The piezoelectric device is driven at a frequency in the range of from 100 to 300 kHz which gives rise to a stream of droplets 17 that are generated at the frequency of the piezoelectric device. The pressure of the ink in the manifold is controlled by the pump 31 and establishes the velocity of the droplets 17. The pressure variations introduced by the piezoelectric device 35 are small but are adequate to establish the rate of drop generation. Both the velocity and droplet frequency are under the command of a microcomputer or controller 36. Droplet velocity is controlled by regulating the pump to appropriately increase or decrease the ink pressure in the manifold 32. The controller communicates with the pump 31 via amplifier 37 and digital-to-analog (D/A) converter 38. The controller communicates with the piezoelectric device by means of the amplifier 39 and D/A converter 40.

A charging electrode 42 for each nozzle is located at the position where a droplet 17 is formed from the stream 34. The charge electrodes are also under the control of the controller 36. The electrodes 42 are driven by means of an amplifier 43 and a D/A converter 44 coupled to electronic circuitry within the controller which generates the appropriate voltage. The function of the charging electrodes is to impart a net positive or negative charge to a droplet 17. The fluid is conductive and is electrically coupled to ground through the manifold 32. When a voltage is applied to an electrode 42 at the instant of droplet formation, the droplet assumes a charge proportional to the voltage applied to the electrode. In the embodiment illustrated in FIGS. 1 and 2, uncharged droplets follow an undeflected flight path 45 to the recording medium 46. Charged droplets are deflected left and right of path 45 and in the X direction depending upon the sign of the charge. The X direction is determinable from the X, Y, and Z coordinate system shown in FIG. 1. Predetermined values of positive charge for a droplet 17 will cause it to follow a path that directs it into a gutter 49 located to the right or left of the centerline paths 45. The ink collected in gutter 49 is returned to the reservoir via conduit 41.

As discussed more fully later with respect to FIGS. 3 and 4, the nozzles of the printhead each employ two of the two-dimensional differential optical sensors 14 which are a subject of the present invention. The two-dimensional sensors 14 are mounted on sensor support boards 52 but are alternately inverted. The support boards have an aperture 53 that permits the droplets 17, emitted by the nozzles, to pass therethrough and be either collected by gutters 49 or impact the recording medium 46. A charged droplet is deflected due to a static electric field between left and right deflection plates 47 and 48 associated with each nozzle. The deflection plates 47 have very high voltages coupled to them while the deflecting plates 48 are grounded, as indicated by the +V and ground symbols shown in FIG. 2, to create the deflection fields. The potential difference between the deflection plates is generally in the magnitude of 2,000 to 3,000 volts. The magnitude of the voltage applied to the charging electrode 42 is generally in the range of +200 to −200 volts.

Figure 2:
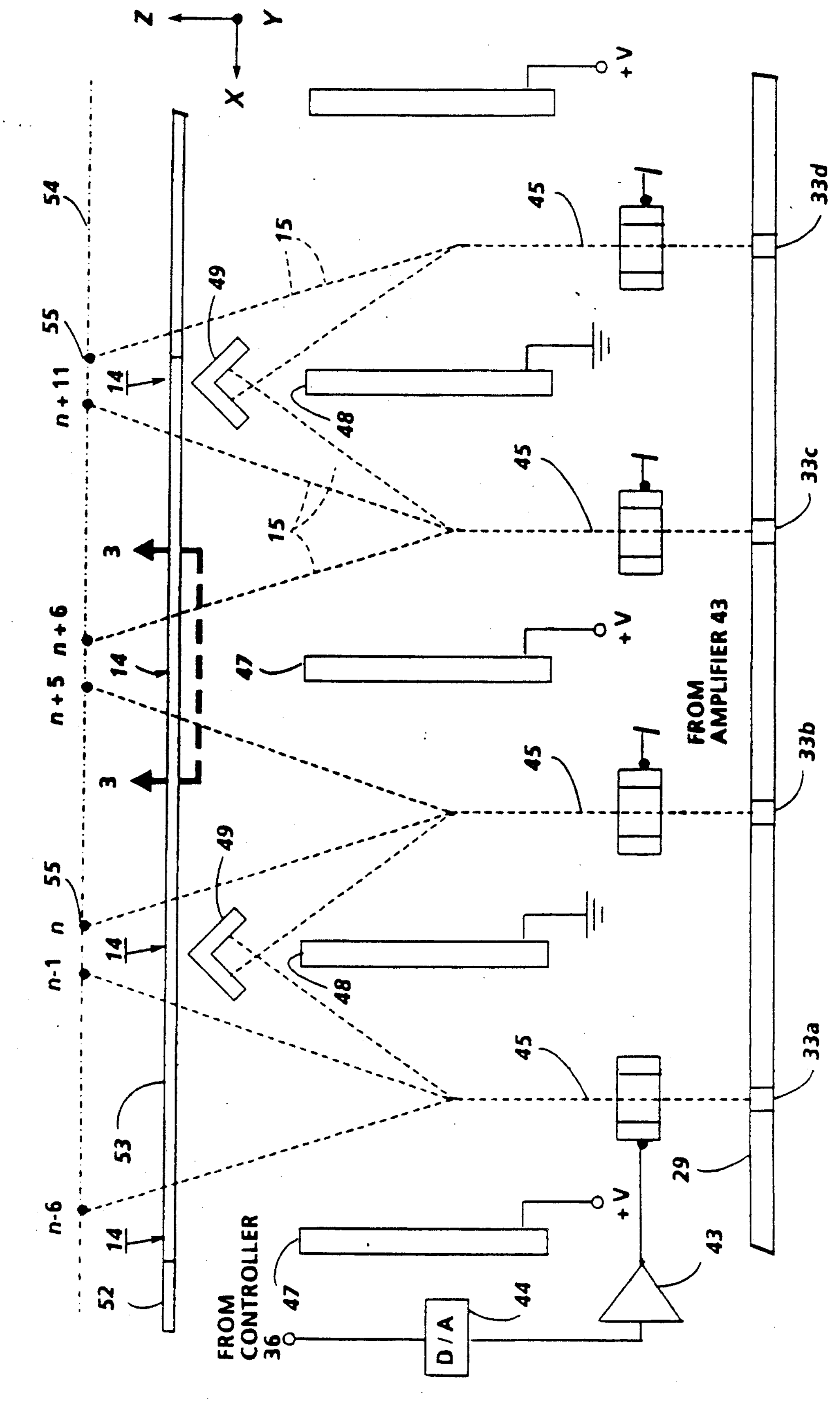
FIG. 2 is a plan view in schematic form of a major portion of the ink jet printer of FIG. 1 illustrating the multiple nozzle and sensor layout.

Referring to FIG. 2, the gutters 49 are shown located at about half the distance between every two nozzles and downstream from the grounded deflection plate 48. Accordingly, adjacent nozzles are able to have droplets deflected to the same gutter, so that there are only one gutter 49 for each two nozzles. Each nozzle also has a pair of identical two-dimensional differential optical sensors 14, which are the subject matter of the present invention, located on the support boards 52 downstream from the deflection plates 47, 48 and gutters 49. The pair of optical sensors are located to sense each of the opposing outermost trajectories of the sweep of droplets emitted from each nozzle, so that one sensor is shared each by two adjacent nozzles.

Each of the plurality of nozzles is responsible for placing a sweep of droplets at some finite number of lineal pixel positions on the recording medium at the printing line 54. The dots 55 represent the pixels or picture elements in a row which are the desired impact targets for the droplets passing through the deflection fields. The deflection fields sweep the droplets in a nominal deflection plane to print a single line of pixels across the width of the recording medium. Each nozzle is responsible for a segment of the pagewidth line. Nozzle **33*b* is responsible for placing a droplet at each of the N through N+5 pixel locations on the printing plane 54 which is the surface of the recording medium as shown in FIG. 1. The adjacent nozzle 33*a* is responsible for placing droplets at pixel locations N−1 through N−6. Similarly, nozzle 33*c*** is responsible for placing droplets at the N+6 through N+11 pixel positions and so on. When the droplets from adjacent nozzles are in fact aligned to adjacent pixel positions such as the N and N−1 positions or N+5 and N+6 positions, the droplets from the nozzles are said to be stitched together.

By stitching, it is meant the accurate side-by-side placement of adjacent endmost droplets from two separate but adjacent nozzles on the recording medium. The printed pixels are stitched if they are substantially without gap or overlap and are in the same droplet deflection plane 70 (see FIG. 3). The differential optical sensors 14 are built near the edge of each droplet deflection scan or sweep from each nozzle, giving N+1 stitch sensor sites for N nozzles. This sensor provides a two-point narrow field of view measurement system for each endmost droplet trajectory (e.g. left and right trajectories) in each deflection scan width of droplet trajectories per nozzle or ink stream. Each sensor consists of a pair of closely adjacent photodetectors and source of light directing two beams of light thereto thereby creating two differentially detected optical axes at respective angles $\Phi_1$ and $\Phi_2$ relative to a line perpendicular to the midpoint between the pair of coplanar photodetectors as explained more fully below with respect to FIGS. 3 and 4. At the site of one sensor, droplets are detected from one nozzle, when they begin blocking light to the photodetectors from one emitter, and, as the droplet charging voltage is incremented, the controller stores the two values of charge tunnel or electrode voltage where the differential zero-crossings occur; i.e., the optical axis crossings. The charged droplet trajectory which passes the differential zero crossing point of the pair of photodetectors is established by a calibration process in which a plurality of identically charged droplets follow the same trajectory to a calibrating gutter (not shown) behind the printing plane with the printing medium or paper removed. Each of the droplets are sensed and the resultant usually integrated over time to establish the sensor differential output signal for that particular charge tunnel voltage applied to the droplets. The next output signal is similarly established by slightly increasing or decreasing the charge electrode voltage. As the trajectories are swept across the optical sensor on one side of the ink streams deflection plane, the light beam impinging on one of the photodetectors will at first be only partially blocked while the other is not. As the trajectories are changed they move to the zero crossing point for the first optical axis 11*a* or 11*b* where equal amounts of light are blocked from each of the pair of photodetectors. This is repeated for the next optical axis, 11*b* or 11*a* at this sensor location. This is then repeated for the outermost droplet trajectories on the other side of the scan or sweep of droplets from that particular nozzle. Using these four voltage values and the fixed physical sensor and deflection parameters of angles $\Phi_1$ and $\Phi_2$, deflection plane tilt W, and deflection distance k, the controller calculates the two outermost voltages V (i.e., the stitch voltages) and the Y elevation for the outermost droplet trajectories. These Y values will not usually be the same, but will be within a calculable error of each other. The process is repeated for each nozzle across the array, storing two stitch voltage values and two Y values for each nozzle or ink stream. Then, the lowest Y value ink droplet trajectory is assigned zero charging delay. Next, the adjacent droplet trajectories are assigned a delay based on the paper speed and the $\Delta Y$ at the appropriate sensor. This process cancels out the sensor systematic Y error at the sensor as explained later. This is repeated on the next left and right adjacent ink streams from nozzles located on each side of the nozzle calibrated, finally resulting in a table of left and right stitch voltages and charge delay times for all ink streams, emitted from the array of nozzles. Of course, other calculations not important to the understanding of this invention would be necessary, for example the adjustment in stitch voltage for the sensor plane to paper plane distance, depending on whether the sensor is located in front of or behind the recording medium or printing plane.

Figure 3A:
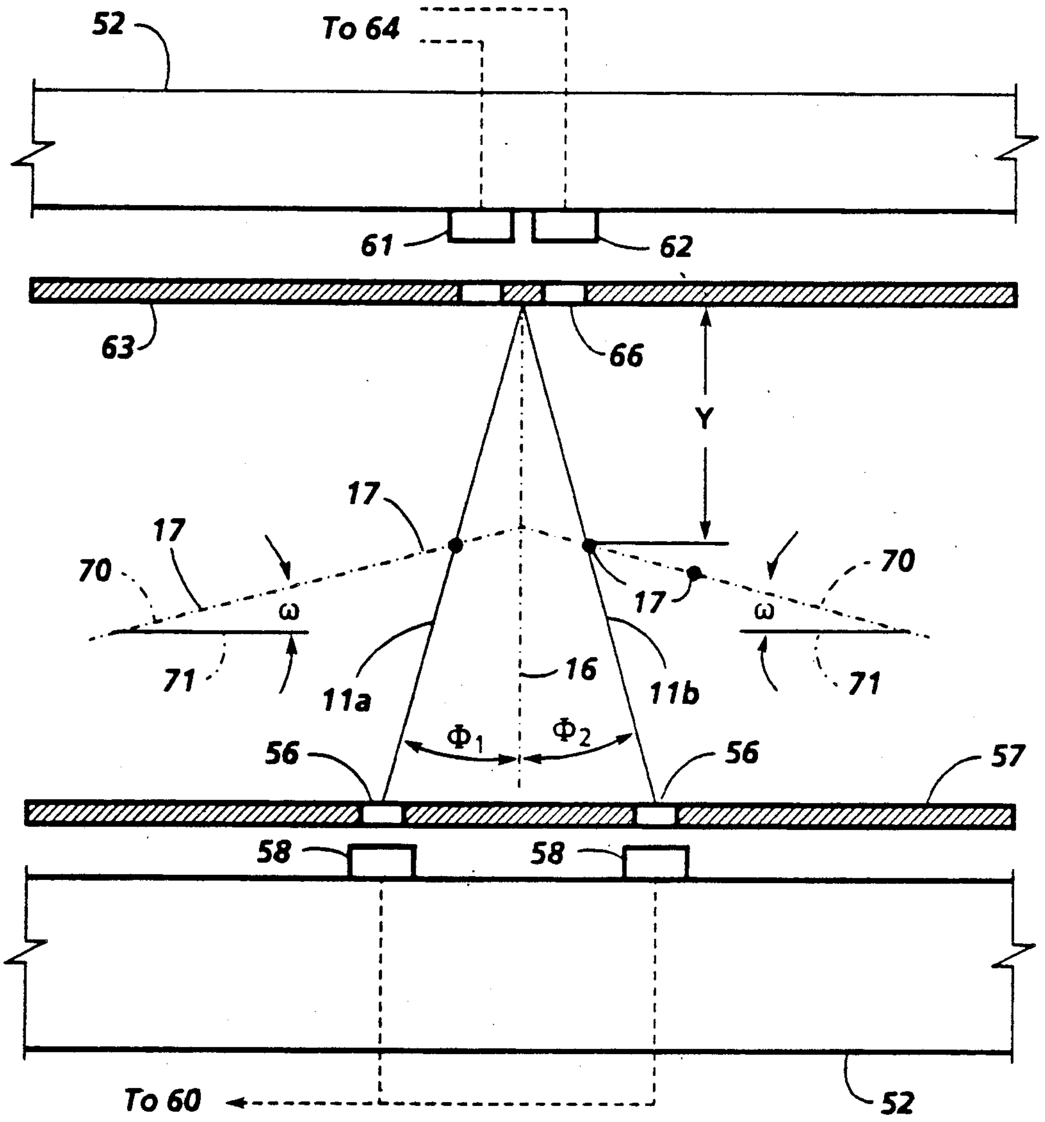
FIG. 3A is an enlarged schematic view of one intersection site of the two-dimensional, differential optical sensor of the present invention as viewed along line 3—3 of FIG. 2.
Figure 3B:
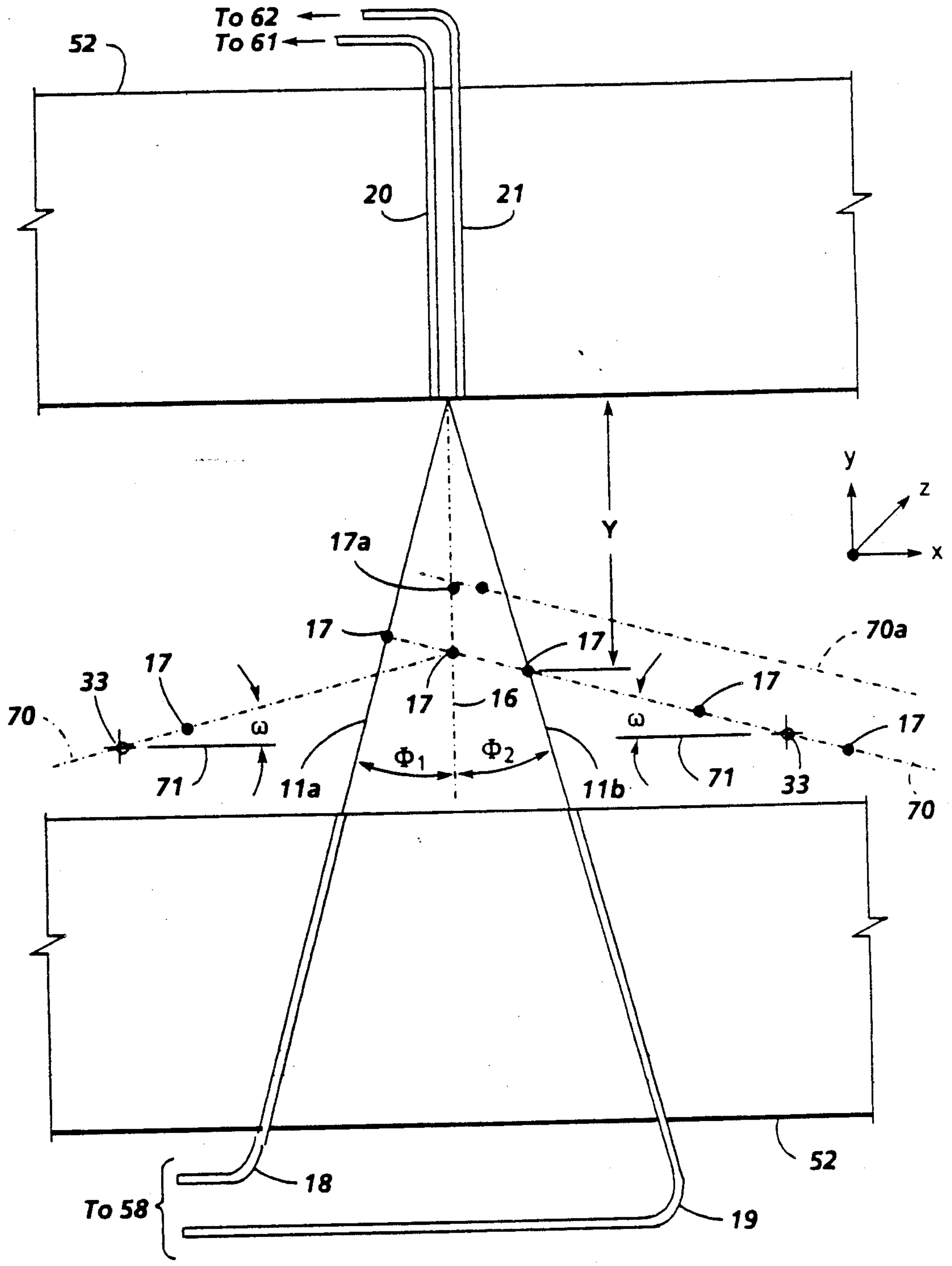
FIG. 3B is an enlarged schematic view of one intersection site of an alternate embodiment of the optical sensor of FIG. 3A.
Figure 4:
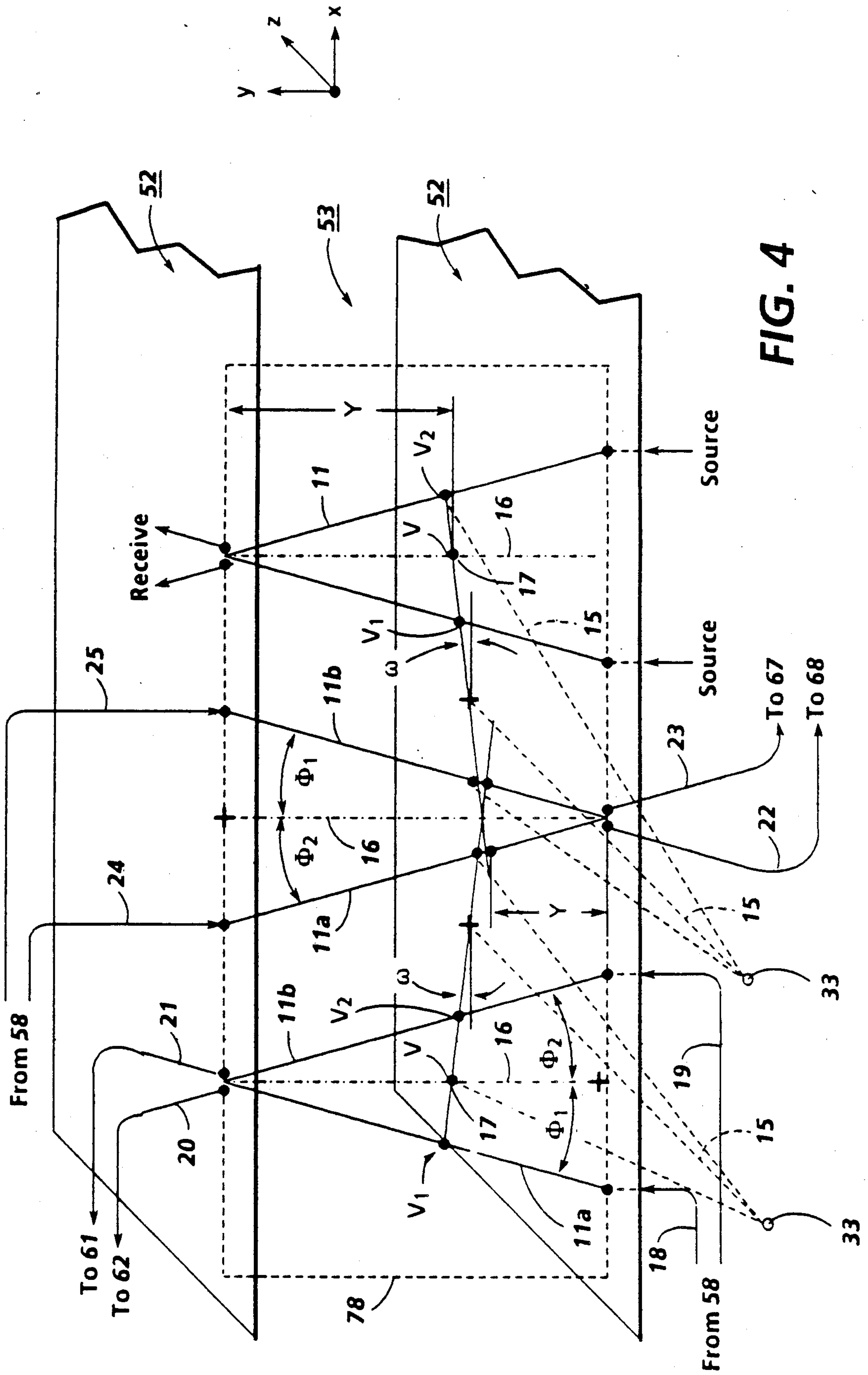
FIG. 4 is a schematic isometric view of the pairs of light receiving photodetectors or intermediate optical fibers and their relative positions with respect to the light emitters shown in FIGS. 3A and 3B.

Each sensor 14, discussed below with respect to FIGS. 3 and 4, is part of a servo loop which identifies the voltage applied to the charging electrode 42 when the droplets from either of two adjacent nozzles pass exactly through each optical axis 11*a* and 11*b* of FIG. 3, which are formed by light emitters 18 and 19 and differential photodetectors 61 and 62. In FIG. 3B, the light emitters are optical fibers and the photodetectors receive light therefrom via optical fibers 20 and 21. In the preferred embodiment of FIG. 3A, the light emitters may be any light source such as LEDs which emit light through associated apertures 56 in mask 57 spaced therefrom. Photodetectors or photodiodes 61, 62 receive light through apertures 66 in a second mask 63. The emitters (i.e., LEDs 58, mask 57, and apertures 56 or the free ends of the input optical fibers 18, 19) are coplanar and separated by the perpendicular line 16 from the midpoint between the photodetector apertures 56 or the pair of free ends of the output optical fibers 20, 21. The emitters and detectors are on opposite sides of the deflection plane 70, in which the trajectories 15 of the droplets 17 pass through the sensor xy optical plane. The improved droplet sensor of this invention is optionally located upstream or downstream of each paper plane stitch point and the optical paths are alternately inverted, so that maximum separation between emitters at one location and detectors at adjacent locations are obtained. This also provides easier fabrication of each substrate or support board 52 because of the wider separations between emitters and detectors.

Referring to FIG. 1, the position servo system includes the controller 36, light source 58, photodetectors 61 and 62, and differential amplifier 64 for one endmost droplet trajectory from one nozzle. A similar position servo system detects the opposite endmost droplet trajectory and comprises photodetectors 67 and 68, differential amplifier 69, and analog to digital converter 72. The light source 58 which may be one or more LEDs, is electrically coupled to the controller 36 via the amplifier 60, and may be operated in a continuous wave or pulse mode. Each sensor 14 is the same for each one mounted on the support board 52, so the description of the operation of one will suffice as a description for all. In fact, the light source or LED, the photodiodes or photodetectors, and related circuitry may be shared in a similar manner to that disclosed in the above-mentioned U.S. Pat. No. 4,255,754 to Crean et al.

FIGS. 3A and 3B show an enlarged partial schematic view of the sensor support board 52 taken along view line 3—3 of FIG. 2. The X, Y, and Z coordinate axis is illustrated for convenience. The support board 52 includes an aperture 53 in the XY plane to allow the droplets moving in the Z direction (i.e. into the plane of the drawing) to pass through the board aperture 53 towards the print line 54 on the recording medium 46 (not shown). The points 17 indicate the droplets issued from the nozzles 33 of the droplet generator 29 of FIGS. 1 and 2 as they pass through the sensor plane.

The two-dimensional, differential sensing sensor 14 of the present invention is illustrated in FIGS. 3A and 3B. In FIGS. 3B, it is shown with first and second input optical fibers 18 and 19, though any light transmissive optical channels may be used such as, for example, wave guides made by photopolymer treatment or apertured LEDs shown in FIG. 3A. One end of the input fibers are coupled to a light source or LED 58 and the other free ends each direct a cone or beam of light on the free ends of the output fibers 20 and 21, thereby forming differentially detected optical axes 11*a* and 11*b* through the deflection plane 70 of the droplets from two adjacent nozzles. To account for the constant speed of the recording medium in the +Y direction, the nominal deflection plane 70 is at a slight incline to the XZ plane 71 shown as angle $\omega$. Thus, droplets may impact the recording medium earlier and later than the center droplets yet still form a straight line thereon.

Associated with input fibers 18 and 19 is a pair of output fibers 20 and 21. The input fibers and optical center of the output fiber pairs form two differentially sensed optical axes 11*a* and 11*b*. The free ends of the input fibers are confrontingly spaced from the free ends of their associated pairs of output fibers. The free ends of the input fibers and associated pairs of output fibers are separated by the ink droplet deflection plane 70. In FIG. 3A, apertures 56 in mask 57 direct light from a light source such as, for example, LEDs 58 illuminating photodetectors 61, 62 via apertures 66 in mask 63. The optical axes 11*a* and 11*b* are created by differential sensing of the zero crossing signal of the photodetectors 61, 62 as droplets traveling therethrough are detected.

The precise optical axes 11, in FIGS. 3A, 3B, and 4, avoid many of the problems described above. The precise optical axis is defined as that axis crossed by a droplet which produces a differential zero crossing signal from the two photodetectors. The voltage of the charging electrode 42 which caused the trajectory to achieve this zero crossing signal is then identified as $V_1$ or $V_2$ and stored for use in calculating the height Y (sagittal direction), and the horizontal stitch voltage V. For a linear deflection system having a single pair of optical axes 11 arranged at angles $\Phi_1$ and $\Phi_2$ to the perpendicular line 16 from the pair of output fiber free ends (also the desired perpendicular stitch line), then the deflection voltage V at the stitch line 16 and the sagittal height Y in the YX sensor plane can be calculated from the two voltages $V_1$, $V_2$ corresponding to the ink droplet stream 34 being deflected across both optical axis 11*a* and optical axis 11*b* at each droplet stream 34 boundary. Namely, $$V=[V_1/(p+1)]+[V_2/(1/p+1)]\text{(in actual volts)}$$

where:

$p=[\sin\Phi_2/\sin\Phi_1][\sin(90+\omega-\Phi_1)/\sin(90-\omega-\Phi_2)$ $Y=[\kappa(V'_2-V'_1)]/[\sin\Phi_2/\sin(90-\omega-\Phi_2)+\sin\Phi_1/(\sin 90+\omega-\Phi_1)]$ $V'_1$, $V'_2$—fractional parts of full scale voltage range (for Y calculation)

$$V'_1=V_1/[|V_{left}|+|V_{right}|]$$

$$V'_2=V_2/[|V_{left}|+|V_{right}|]$$

$\Phi$=values per FIGS. 3 and 4

$\omega$=angle of deflection plane shown in FIGS. 3 and 4

$\kappa$=full scale deflection distance (stitch point to stitch point in deflection plane)

Since the sensor 14 can be built in one planar structure (i.e. XY plane), there is only top-to-bottom alignment, but not a problem of two separate top and bottom structures displaced in the droplet trajectory or Z direction to complicate the sensor fabrication. The approach requires only four light sources or input optical fibers and two differential receiver pairs per boundary side of the droplet stream deflection plane (e.g., for each pair of outermost droplet trajectories per nozzle) to accomplish the same results using four light sources or input optical fibers and four differential receiver pairs in the approach disclosed in U.S. 4,751,517 to Crean et al to obtain the equivalent data. Another advantage of the sensor shown in FIGS. 3A, 3B, and 4 is that false optical axes produced by stray or reflected light does not occur because the alternate "inverted V" configuration is used, so that the nearest opposing non-functional receiver pair is well over one deflection range away from the functional pair. This is also referred to as a "pitch". In the prior art, the receiver pairs are a small fraction of a pitch between each other.

The ability to perform both a stitch or X direction and sagittal or Y direction measurement at each jet stream boundary allows the sagittal measurement and correction process to be essentially relative at each boundary or stitch point, where all ink streams can be measured at all boundaries. Starting with the greatest sagittal value adjusted to a minimum delay (time delay in charging is used), the ink streams or jets on both sides of this can be adjusted to the same value based on the sagittal difference and paper speed, and so on across the pagewidth array. Although there is a second order error in the measurement of Y and V caused by $\omega$ variation from the nominal value 71, the much larger Y calculation errors caused by $\omega$variation with one-sided sagittal measurement and non-relative sagittal measurement and correction as taught in U.S. Pat. No. 4,751,517 to Crean et al are eliminated. For example, errors in angles $\Phi_1$ and $\Phi_2$ may result in an absolute error in the calculated value of Y, but, at each sensor site, the error will be nearly the same for adjacent droplet streams and will therefore cancel out.

In FIG. 3B, the input fibers 18 and 19 are on opposite sides of the perpendicular line 16 from the free ends of the pair of output fibers 20, 21, and the optical axes 11 are directed from respective input fibers to the output fibers, so that the optical axes form an angle $\Phi_1$ and $\Phi_2$, respectively, relative to the perpendicular line 16. Light received by the output fibers 20, 21 are directed to photodetectors 61, 62, respectively. Referring to FIGS. 1 and 3B, all of the optic fibers 20 may be bundled and coupled to a photodetector or photodiode 61, and the bundle of output fibers 21 may be coupled to photodetector 62. The photodetectors 61 and 62 are coupled to one or more differential amplifiers 64. The signal from the differential amplifier 64 is coupled to controller 36 through analog to digital (A/D) converter 65. Alternatively, multiple photodetectors and associated electrical circuitry may also be used.

After all of the nozzles have been measured for stitching and sagittal values, correct phase, and drop velocity, the printing operation is ready to begin. The recording medium 46 is moved in the +Y direction in the XY plane according to the X, Y, and Z coordinates shown in FIG. 1. The drive wheel 73 is shown in the operative position to transport the recording medium in the +Y direction. The drive wheel is mechanically powered by an electric motor 74. The motor is under the control of the controller 36 by virtue of the amplifier 75 and digital to analog converter 76. Video information is fed into the controller 36 as indicated by arrow 77. The video information is buffered, but not to compensate for paper speed or droplet generation rate. The paper speed is controlled by the paper servo to assure the correct resolution. The data is buffered for several scan lines, and droplet streams or jets have their data selectively delayed in accordance with their measured sagittal values. The lowest pointing jet is least delayed; higher pointing jets have their data delayed so that the printed image from the lowest jet will have moved up to their position (assuming paper is in the XY plane and moving in the +Y direction).

The printing or recording process begins by the controller 36 issuing a command to motor 74 to start moving the recording medium 46 past the printing line 54. The plurality of nozzles issue pressurized ink streams 34 which break up into droplets 17 at the charge electrodes 42 which are simultaneously fed video information from the controller that causes the drops to be charged by the charging electrodes to a value to place them at the desired positions for each nozzle. The movement of the recording medium in the Y direction propagates a row of drops over the recording medium to achieve the creation of the entire raster image.

In FIG. 4, a schematic isometric view is shown depicting the alternating inversion of the two emitters or input fibers and detector pairs or output fiber free ends in a coplanar sensor array between the top and bottom substrates of support boards 52 which form aperture 53. The coplanar sensor array lies in plane 78 shown in dashed line.

In summary, improved differential optical sensors are mounted at every intersection of the deflection planes of the ink droplets issued by a multi-nozzle printhead of a pagewidth continuous stream ink jet printer. These sensors are located near the printing plane and gutters of the printer. They comprise first and second optical emitters, each coupled to a light source and confronting an associated pair of optical detectors. The emitters and detectors are on opposite sides of the droplet deflection plane, and the emitters are on opposite sides of the perpendicular line from the pair of detectors. The light from the emitters impinging on the pair of detectors creates differentially detected zero crossing optical axes at predetermined angles with respect to the perpendicular line. The detectors are coupled to differential circuitry, so that each jet or ink stream may be characterized for horizontal (X) deflection sensitivity and vertical (Y) droplet position at each stitch boundary.

Other objects and features of the invention will be apparent to those skilled in the art from a reading of the specification and from the drawings. Such modifications are intended to be included within the scope of the present invention.

I claim:

1. A differential signal generating optical sensor for sensing the position of ink droplets passing thereby relative to the droplets' deflection voltage in the horizontal direction and in absolute value in the vertical direction, comprising:

means for directing a first beam of light from a first substrate on one side of a droplet trajectory to coplanar receiving apertures of a first pair of receiving channels located in a second substrate on the opposite side of the droplet trajectory and thereby creating a differentially detected zero-crossing optical axis at a predetermined angle $\Phi_1$ with respect to a perpendicular line from the midpoint between said coplanar receiving apertures, the angle $\Phi_1$ being determined about said perpendicular line and from said second substrate, the first and second substrates being parallel to each other, each aperture of the first pair of channels being respectively coupled to first and second photodetectors, each photodetector producing an output signal upon receipt of light;

means for directing a second beam of light from the first substrate to said coplanar receiving apertures of the first pair of receiving channels located in the second substrate thereby creating a differentially detected zero-crossing optical axis at a second predetermined angle $\Phi_2$ with respect to the perpendicular line from the midpoint between coplanar receiving apertures of the first pair of channels, the angle $\Phi_2$ being determined about said perpendicular line and from said second substrate, the first and second beams of light being on opposite sides and in a plane containing the perpendicular line;

first differential circuitry for receiving the output signals from the first and second photodetectors and, in response thereto, for determining a deflection voltage V for directing a subsequent droplet along the desired trajectory; and controller means for receiving the output signals from the first and second photodetectors and for calculating the vertical (Y) droplet positions in response thereto of that droplet trajectory.

2. The optical sensor of claim 1, wherein said optical sensor senses droplets ejected from at least one nozzle of a printhead, the droplets being directed towards a recording medium, each droplet being charged with a predetermined voltage and directed through a deflecting electrical field to enable a series of different droplet trajectories to be spread over a predetermined distance, so that as the droplets impact the recording medium they may print along a straight line for a fixed distance, said first and second light beams and associated first pair of channels being located to sense droplets traveling along one of the endmost trajectories.

3. The optical sensor of claim 2, wherein the optical sensor further comprises:

means for directing a third beam of light from the second substrate on one side of the droplet trajectories to coplanar receiving apertures of a second, identical pair of receiving channels located in the first substrate on the opposite side of the droplet trajectories and thereby creating a differentially detected zero-crossing optical axis at a predetermined angle $\Phi_1$ with respect to a perpendicular line from the midpoint between said coplanar receiving apertures, the angle $\Phi_1$ being determined about said perpendicular line and from said first substrate, each opposite aperture of the second pair of channels being respectively coupled to third and fourth photodetectors, each of which produce an output signal upon receipt of light;

means for directing a fourth beam of light from the second substrate to said coplanar receiving apertures of the second pair of transmitting channels located in the first substrate thereby creating a differentially detected zero-crossing optical axis at a second predetermined angle $\Phi_2$ with respect to the perpendicular line from the midpoint between the coplanar receiving apertures of said second pair of receiving channels, the angle $\Phi_2$ being determined about said perpendicular line and from said first substrate, the third and fourth beams of light being on opposite sides and in a plane containing the perpendicular line from the receiving apertures of the second pair of receiving channels, said third and fourth light beams and associated second pair of channels being located to sense the droplets traveling along the opposite endmost trajectory from the one sensed by the first and second light beams and associated first pair of channels;

second differential circuitry for receiving the output signals from the third and fourth photodetectors and in response thereto for determining a deflection voltage V for directing a subsequent droplet along the desired trajectory; and said controller means for receiving the output signals from the third and fourth photodetectors and for calculating the vertical (Y) droplet positions in response thereto of that droplet trajectory.

4. The optical sensor of claim 3, wherein said first, second, third, and fourth beams of light are emitted from optical fibers, and wherein said first and second coplanar receiving aperture pairs are also ends of optical fibers which direct the received light to respective photodetectors.

5. An ink droplet differential sensing sensor in an ink jet printer having a printhead with a plurality of nozzles from which streams of ink droplets are ejected towards a moving recording medium, the differential sensing sensor monitoring the ink droplets from at least one nozzle during their flight to the recording medium or collecting gutter, said monitoring being concurrently in both a horizontal direction and a vertical direction at the sensor plane, the differential sensing sensor comprising:

first and second input apertures and an associated pair of adjacent coplanar output apertures, the input apertures being confrontingly spaced from the associated pairs of output apertures, the first input aperture directing a first light beam to the pair of output apertures thereby creating a differentially detected zero-crossing optical axis at an angle $\Phi_1$ from a perpendicular line from the midpoint between said output apertures, the second input aperture directing a second light beam to said output apertures thereby creating a differentially detected zero-crossing optical axis at an angle $\Phi_2$ from the perpendicular line, the first and second input apertures being on opposite sides of said perpendicular line from the pair of output apertures, and the input apertures and pair of output apertures being on opposite sides of the ink droplet deflection plane;

first differential circuit means electrically coupled to the pair of output apertures via a respective pair of photodetectors, the first circuit means indicating the charge voltage of the ink droplets relative to the perpendicular line from the associated pair of output apertures and the vertical height above the output apertures; and the second input apertures, together with their associated pair of output apertures, lying substantially in the same plane, this same plane being perpendicular to the droplet deflection plane, so that each sensed droplet position may be concurrently determined relative to the droplet deflection plane in terms of charge voltage and vertical height above the output apertures by said differential sensing sensor as it travels along a flight path therepast towards the recording medium or gutter.

6. The differential sensing sensor of claim 5, wherein the first and second input apertures and associated pair of output apertures are located to sense droplets traveling along one of the endmost trajectories in the range of trajectories available in the droplet deflection plane; and wherein another identical differential sensing sensor is located to sense droplets in the opposite endmost trajectory, the other differential sensing sensor being inverted to keep the pairs of output apertures on the same substrate spaced to prevent receipt of stray light and inadvertent false data.

* * * * *